(12) United States Patent
Ihn et al.

(10) Patent No.: US 11,803,098 B2
(45) Date of Patent: Oct. 31, 2023

(54) HIGH-BRIGHTNESS QUANTUM SOURCE BASED ON MULTI-WAVELENGTH COMBINATION VIA ARRAYED TYPE-0 PPKTP CRYSTAL AND METHOD OF GENERATING ENTANGLED PHOTON PAIRS

(71) Applicant: AGENCY FOR DEFENSE DEVELOPMENT, Daejeon (KR)

(72) Inventors: Yong Sup Ihn, Daejeon (KR); Dongkyu Kim, Daejeon (KR); Kyungdeuk Park, Daejeon (KR); Dohoon Lim, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 18/129,967

(22) Filed: Apr. 3, 2023

(65) Prior Publication Data
US 2023/0314900 A1    Oct. 5, 2023

(30) Foreign Application Priority Data
Apr. 4, 2022  (KR) .......................... 10-2022-0041889

(51) Int. Cl.
*G02F 1/39*   (2006.01)
*G02F 1/35*   (2006.01)
*G02F 1/355*  (2006.01)

(52) U.S. Cl.
CPC ............ *G02F 1/397* (2013.01); *G02F 1/3503* (2021.01); *G02F 1/3507* (2021.01); *G02F 1/3551* (2013.01)

(58) Field of Classification Search
None
See application file for complete search history.

(56) References Cited

U.S. PATENT DOCUMENTS

| | | | |
|---|---|---|---|
| 10,595,102 B2 | 3/2020 | Brodsky et al. | |
| 11,448,938 B2* | 9/2022 | Cushing | ................... G01J 3/10 |
| 11,586,092 B2* | 2/2023 | Earl | ....................... G02F 1/3526 |
| 2021/0105135 A1 | 4/2021 | Figueroa et al. | |

FOREIGN PATENT DOCUMENTS

| | | |
|---|---|---|
| JP | 5488342 B2 | 5/2014 |
| KR | 102354495 B1 | 1/2022 |
| WO | 2020/072005 A1 | 4/2020 |

OTHER PUBLICATIONS

Y. Xue, A. Yoshizawa and H. Tsuchida, "CW-laser-pumped telecom-band polarization-entangled photon-pair source with a fidelity of 97.8%," 2011 Conference on Lasers and Electro-Optics Europe and 12th European Quantum Electronics Conference (CLEO EUROPE/EQEC), Munich, Germany, 2011, pp. 1-1. (Year: 2011).*

* cited by examiner

*Primary Examiner* — Rhonda S Peace
(74) *Attorney, Agent, or Firm* — Dilworth & Barrese, LLP; Michael J. Musella, Esq.

(57) ABSTRACT

A quantum source includes: a quantum source generator dividing a pump beam into a plurality of channels and generating a plurality of signals and a plurality of idlers using nonlinear crystals respectively located optical paths of the plurality of channels; and an entangled photon pair combiner outputting an enhanced signal by combining the plurality of signals and outputting an enhanced idler by combining the plurality of idlers.

15 Claims, 10 Drawing Sheets

HIGH-BRIGHTNESS QUANTUM SOURCE BASED ON MULTI-WAVELENGTH COMBINATION VIA ARRAYED TYPE-0 PPKTP CRYSTAL AND METHOD OF GENERATING ENTANGLED PHOTON PAIRS

CROSS-REFERENCE TO RELATED APPLICATION

This application claims priority to and the benefit of Korean Patent Application No. 10-2022-0041889 filed in the Korean Intellectual Property Office on Apr. 4, 2022, the entire contents of which are incorporated herein by reference.

BACKGROUND

(a) Field

Embodiments of the present invention relates to a high-brightness quantum source based on multi-wavelength combination via arrayed type-0 ppKTP crystal and a method of generating entangled photon pairs.

(b) Description of the Related Art

The generating of entangled photon pairs is not only a key element in fundamental research fields, such as quantum optics, but also an essential technology in real-world quantum information technologies, such as quantum communication, quantum computing, and quantum sensing. However, the realization of a global quantum network that may be implemented through links between satellites and the ground or between satellites and the realization of quantum lidar or radar capable of detecting stealth weapon systems call for the development of intensive, robust entanglement light source with a high production rate and entanglement purity.

SUMMARY

From this point of view, high-brightness quantum sources with sufficient brightness and entanglement visibility have been continuously researched and developed through various methods, and among them, spontaneous parametric down conversion (SPDC) based on nonlinear crystals with second-order nonlinear coefficients has been reported as the most appropriate method.

Embodiments of the present invention attempts to provide a high-brightness quantum source and a method of generating an entangled photo pairs, having a more stable combination method by eliminating an interference phenomenon that may occur in the same wavelength combination by using entangled photon pairs generated with different wavelengths according to temperature conditions when developing a high-brightness quantum source based on arrayed combination.

According to an exemplary embodiment, a quantum source includes: a quantum source generator dividing a pump beam into a plurality of channels and generating a plurality of signals and a plurality of idlers using nonlinear crystals respectively located optical paths of the plurality of channels; and an entangled photon pair combiner outputting an enhanced signal by combining the plurality of signals and outputting an enhanced idler by combining the plurality of idlers.

As the respective nonlinear crystals of the plurality of channels are adjusted to different temperatures, the plurality of signals may have different wavelengths and the plurality of idlers have different wavelengths.

The entangled photon pair combiner may include a polarizing beam splitter for combining the plurality of signals or the plurality of idlers.

The entangled photon pair combiner may include a plurality of reflection mirrors and a diffraction grating for combining the plurality of signals or the plurality of idlers.

The entangled photon pair combiner may include a spherical mirror and a diffraction grating for combining the plurality of signals or the plurality of idlers.

According to another exemplary embodiment, a quantum source includes: a first channel unit including a first nonlinear crystal controlled to have a first temperature and generating a signal and an idler of a first channel by injecting a pump beam to the first nonlinear crystal; a second channel unit including a second nonlinear crystal controlled to have a second temperature and generating a signal and an idler of a second channel by injecting a pump beam to the second nonlinear crystal; a signal combiner combining the signal of the first channel and the signal of the second channel; and an idler combiner combining the idler of the first channel and the idler of the second channel.

As the first nonlinear crystal and the second nonlinear crystal are adjusted to have different temperatures, the signal of the first channel and the signal of the second channel have different wavelengths and the idler of the first channel and the idler of the second channel may have different wavelengths.

The quantum source may further include: a third channel unit including a third nonlinear crystal adjusted to have a third temperature and generating a signal and an idler of a third channel by injecting a pump beam to the third nonlinear crystal, wherein the signal combiner combines the signal of the first channel, the signal of the second channel, and the signal of the third channel, and the idler combiner combines the idler of the first channel, the idler of the second channel, and the idler of the third channel.

The signal combiner may include: a polarizing beam splitter combining the signal of the first channel and the signal of the second channel; and a dichroic mirror combining combined light obtained by combining the signal of the first channel to the signal of the second channel, to the signal of the third channel.

The idler combiner may include: a polarizing beam splitter combining the idler of the first channel and the idler of the second channel; and a dichroic mirror combining combined light obtained by combining the idler of the first channel to the idler of the second channel, to the idler of the third channel.

The signal combiner may include: a first diffraction grating; and a plurality of mirrors for injecting the signal of the first channel, the signal of the second channel, and the signal of the third channel to the first diffraction grating, wherein the first diffraction grating generates an enhanced signal by combining the signal of the first channel, the signal of the second channel, and the signal of the third channel.

The idler combiner may include: a second diffraction grating; and a plurality of mirrors injecting the idler of the first channel, the idler of the second channel, and the idler of the third channel injected into the second diffraction grating, wherein the second diffraction grating generates an enhanced idler by combining the idler of the first channel, the idler of the second channel, and the idler of the third channel.

The signal combiner may include: a first diffraction grating; and a spherical mirror injecting the signal of the first channel, the signal of the second channel, and the signal of the third channel to the first diffraction grating, wherein the first diffraction grating generates an enhanced signal by combining the signal of the first channel, the signal of the second channel, and the signal of the third channel.

The idler combiner may include: a second diffraction grating; and a spherical mirror injecting the idler of the first channel, the idler of the second channel, and the idler of the third channel to the second diffraction grating, wherein the second diffraction grating generates an enhanced idler by combining the idler of the first channel, the idler of the second channel, and the idler of the third channel.

According to another exemplary embodiment, a method of generating entangled photon pairs includes: dividing a pump beam into a plurality of channels; adjusting nonlinear crystals respectively located in optical paths of the plurality of channels to different temperatures; separating signals and idlers for each of a plurality of channels from photon pairs generated by the nonlinear crystals respectively located in the plurality of channels; and generating an enhanced signal by combining the signals for each of the plurality of channels, and generating an enhanced idler by combining the idlers for each of the plurality of channels.

The signals for each of the plurality of channels have different wavelengths, and the idlers for each of the plurality of channels may have different wavelengths.

Using the fact that photon pairs are generated with different wavelengths depending on the temperature through the SPDC of Type-0 ppKTP nonlinear crystal, several crystals are arranged in an arrayed type under different temperature conditions, and signal photons and idler photons generated at different wavelengths are combined to generate an enhanced signal and idler, thereby configuring a high-brightness quantum source. In addition, a high-brightness quantum source of a more stable combination method may be provided by eliminating an interference phenomenon that may occur in the same wavelength combination.

DETAILED DESCRIPTION

Figure 1:
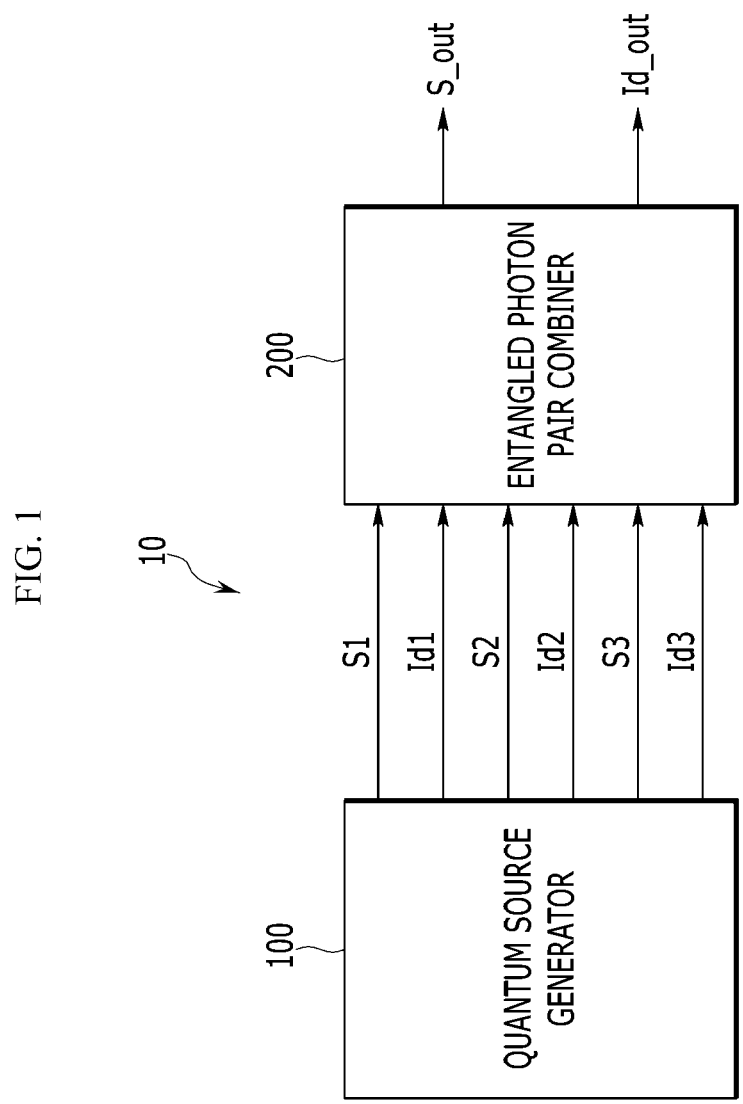
FIG. 1 is a block diagram illustrating a high-brightness quantum source based on multi-wavelength combination according to an exemplary embodiment of the present invention.

Hereinafter, exemplary embodiments of the present invention will now be described more fully hereinafter with reference to the accompanying drawings so that they may be easily implemented by one of ordinary skill in the art. As those skilled in the art would realize, the described exemplary embodiments may be modified in various different ways, all without departing from the spirit or scope of the present invention.

Accordingly, the drawings and description are to be regarded as illustrative in nature and not restrictive. Like reference numerals designate like elements throughout the specification.

In addition, unless explicitly described to the contrary, the word "comprise", and variations, such as "comprises" or "comprising", will be understood to imply the inclusion of stated elements but not the exclusion of any other elements.

FIG. 1 is a block diagram illustrating a high-brightness quantum source based on multi-wavelength combination according to an exemplary embodiment of the present invention.

Referring to FIG. 1, a high-brightness quantum source 10 based on multi-wavelength combination according to an exemplary embodiment of the present invention may include a quantum source generator 100 and an entangled photon pair combiner 200.

The quantum source generator 100 may divide a pump beam into a plurality of channels and generate a plurality of signals S1, S2, and S3 and a plurality of idlers Id1, Id2, and Id3. At this time, the quantum source generator 100 may adjust nonlinear crystals of each of the plurality of channels to have different temperatures, so that the signals S1, S2, and S3 of the plurality of channels may have different wavelengths and the idlers Id1, Id2, and Id3 of the plurality of channels may have different wavelengths.

The nonlinear crystal may be type-0 periodically poled potassium titanyl phosphate, ppKTP (periodically poled $KTiOPO_4$) that causes spontaneous parametric down conversion (SPDC) and has a periodic polling structure. The nonlinear crystal causes SPDC when a continuous wave laser is injected, and one injected photon of the continuous wave laser may create two photons (a photon pair) having a converted wavelength.

The quantum source generator 100 may transfer the plurality of signals S1, S2, and S3 and idlers Id1, Id2, and Id3 of each channel to the entangled photon pair combiner 200 through an optical fiber.

The entangled photon pair combiner 200 may combine the plurality of signals S1, S2, and S3 having different wavelengths input from different channels, and may combine the plurality of idlers Id1, Id2, and Id3 having different wavelengths input from different channels. The entangled photon pair combiner 200 may combine the plurality of signals S1, S2, and S3 to output an enhanced signal S_out, and combine the plurality of idlers Id1, Id2, and Id3 to output an enhanced idler Id_out. The enhanced signal S_out and the enhanced idler Id_out finally output from the entangled photon pair coupler 200 may be used as signals and idlers for a pixel imaging device, a quantum communication device, and the like.

By combining the plurality of signals S1, S2, and S3 having different wavelengths and combining the plurality of idlers Id1, Id2, and Id3 having different wavelengths, interference that may occur in the same wavelength combination may be eliminated and the efficiency of the quantum source may be improved.

Figure 2:
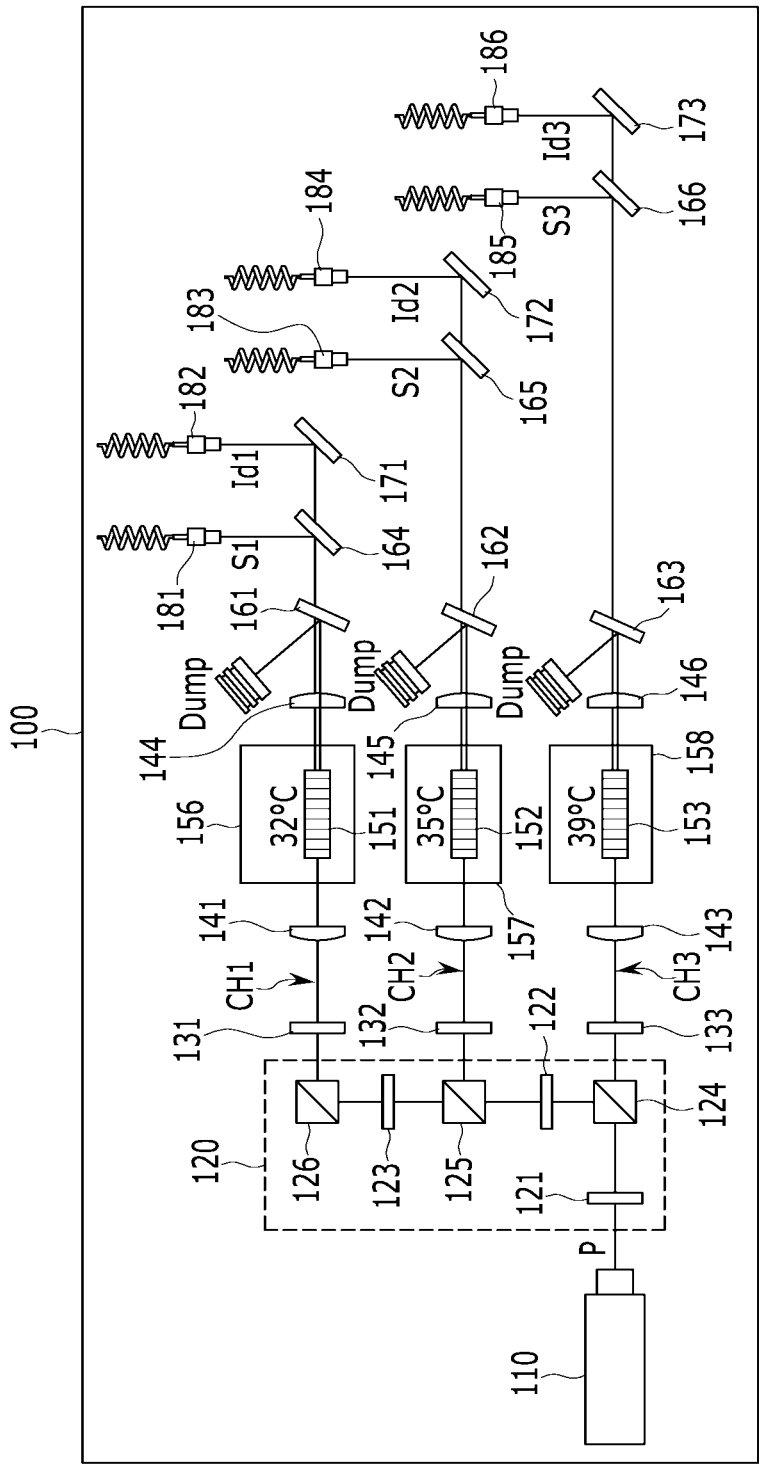
FIG. 2 is a block diagram illustrating a quantum source generator according to an exemplary embodiment of the present invention.

FIG. 2 is a block diagram illustrating a quantum source generator according to an exemplary embodiment of the present invention.

Referring to FIG. 2, the quantum source generator 100 may include a pump laser 110, a beam splitter 120, and a plurality of channel units CH1, CH2, and CH3.

The pump laser 110 may generate a pump beam P and inject the generated pump beam P to the beam splitter 120. The pump beam P may be a continuous wave laser having a wavelength of 405 nm.

The beam splitter 120 may include a plurality of half wave plates (HWPs) 121, 122, and 123 and a plurality of polarizing beam splitters (PBSs) 124, 125, and 126, and may divide a pump beam P into a plurality of channels using the plurality of HWPs 121, 122, and 13 and the plurality of PBSs 124, 125, and 126. The first half wave plate 121, the first polarizing beam splitter 124, the second half wave plate 122, the second polarizing beam splitter 125, the third half wave plate 123, and the third polarizing beam splitter 126 may be arranged in order along an optical path of the pump beam P.

The first polarizing beam splitter 124, the second polarizing beam splitter 125, and the third polarizing beam splitter 126 may serve to divide the pump beam P into a plurality of channels to transmit the same. The first half wave plate 121, the second half wave plate 122, and the third half wave plate 123 may serve to appropriately adjust polarization of the pump beam P to equalize the intensity of the pump beam P transmitted to a plurality of channels for each channel.

The pump beam P may be injected into the first channel unit CH1 through the third polarizing beam splitter 126, the pump beam P may be injected into the second channel unit CH2 through the second polarizing beam splitter 125, and the pump beam P may be injected into the third channel unit CH3 through the first polarizing beam splitter 124.

Each of the first channel unit CH1, the second channel unit CH2, and the third channel unit CH3 may include half wave plates 131, 132, and 133, first lenses 141, 142, and 143, nonlinear crystals 151, 152, and 153, second lenses 144, 145, and 146, first dichroic mirrors 161, 162, and 163, second dichroic mirrors 164, 165, and 166, and reflection mirrors 171, 172, and 173.

The half wave plates 131, 132, and 133 of each channel may set the pump beam P injected into each channel to be vertically polarized. Vertical polarization is polarization required for the nonlinear crystals 151, 152 and 153 to interact with the pump beam P.

The first lenses 141, 142, and 143 of each channel may focus the vertically polarized pump beam P toward the center of the nonlinear crystals 151, 152, and 153, and the second lenses 144, 145, and 146 of each channel may horizontally collimate light formed through the nonlinear crystals 151, 152, and 153.

The nonlinear crystals 151, 152, and 153 of each channel may be type-0 ppKTPs having a periodic polling structure. The three nonlinear crystals 151, 152 and 153 may be arranged side by side in an array. When the pump beam P is injected, the nonlinear crystals 151, 152, and 153 of each channel may cause SPDC to generate a photon pair.

The nonlinear crystals 151, 152, and 153 of each channel may operate under different temperature conditions. To this end, each of the channel units CH1, CH2, and CH3 may include temperature controllers 156, 157, and 158, and each of the temperature controllers 156, 157, and 158 may adjust the nonlinear crystal 151, 152, and 153 of each channel to have different temperatures. The type-0 ppKTP with a periodic poling structure of 3.425 μm generates photon pairs having a central wavelength of 810 nm at 30.2° C. for a wavelength of 405 nm. Because polarizations of the generated signal and idler photons are the same, the type-0 ppKTP may generate signal and idler photon pairs having different wavelengths under temperature conditions of 30.2° C. or higher. For example, the first temperature controller 156 may maintain the first nonlinear crystal 151 of the first channel unit CH1 at 32° C., the second temperature controller 157 may maintain the second nonlinear crystal 152 of the second channel unit CH2 at 35° C., and the third temperature controller 158 may maintain the third nonlinear crystal 153 of the third channel unit CH3 at 39° C.

As the nonlinear crystals 151, 152, and 153 of each channel are adjusted to have different temperatures, the photon pairs of each channel may have different wavelengths. That is, the signals S1, S2, and S3 of the plurality of channels may have different wavelengths, and the idlers Id1, Id2, and Id3 of the plurality of channels may have different wavelengths.

The first dichroic mirrors 161, 162, and 163 of each channel may reflect the pump beam P having a wavelength of 405 nm transmitted through the nonlinear crystals 151, 152, and 153 and allow the photon pairs to be transmitted therethrough. For example, a cut-off wavelength of the first dichroic mirrors 161, 162, and 163 may be 650 nm. The pump beam P reflected by the first dichroic mirrors 161, 162, and 163 of each channel is discarded as a dump, and the photon pairs transmitted through the first dichroic mirrors 161, 162, and 163 are injected into the second dichroic mirrors 164, 165, and 166.

The second dichroic mirrors 164, 165, and 166 of each channel may separate the injected photon pairs into signals S1, S2, and S3 and idlers Id1, Id2, and Id3. That is, the second dichroic mirrors 164, 165, and 166 of each channel may reflect the signals S1, S2, and S3 and allow the idlers Id1, Id2, and Id3 to be transmitted therethrough. The second dichroic mirrors 164, 165, and 166 of each channel may have different cut-off wavelengths corresponding to the photon pairs having different wavelengths for each channel.

The signals S1, S2, and S3 reflected by the second dichroic mirrors 164, 165, and 166 of each channel may be collected to optical fibers by optical fiber couplers (or collimators) 181, 183, and 185, respectively. In addition, each of the idlers Id1, Id2, and Id3 transmitted through the second dichroic mirrors 164, 165, and 166 of each channel may be reflected by the reflection mirrors 171, 172, and 173 and then collected to the optical fibers by collimators 182, 184, and 186.

Figure 3:
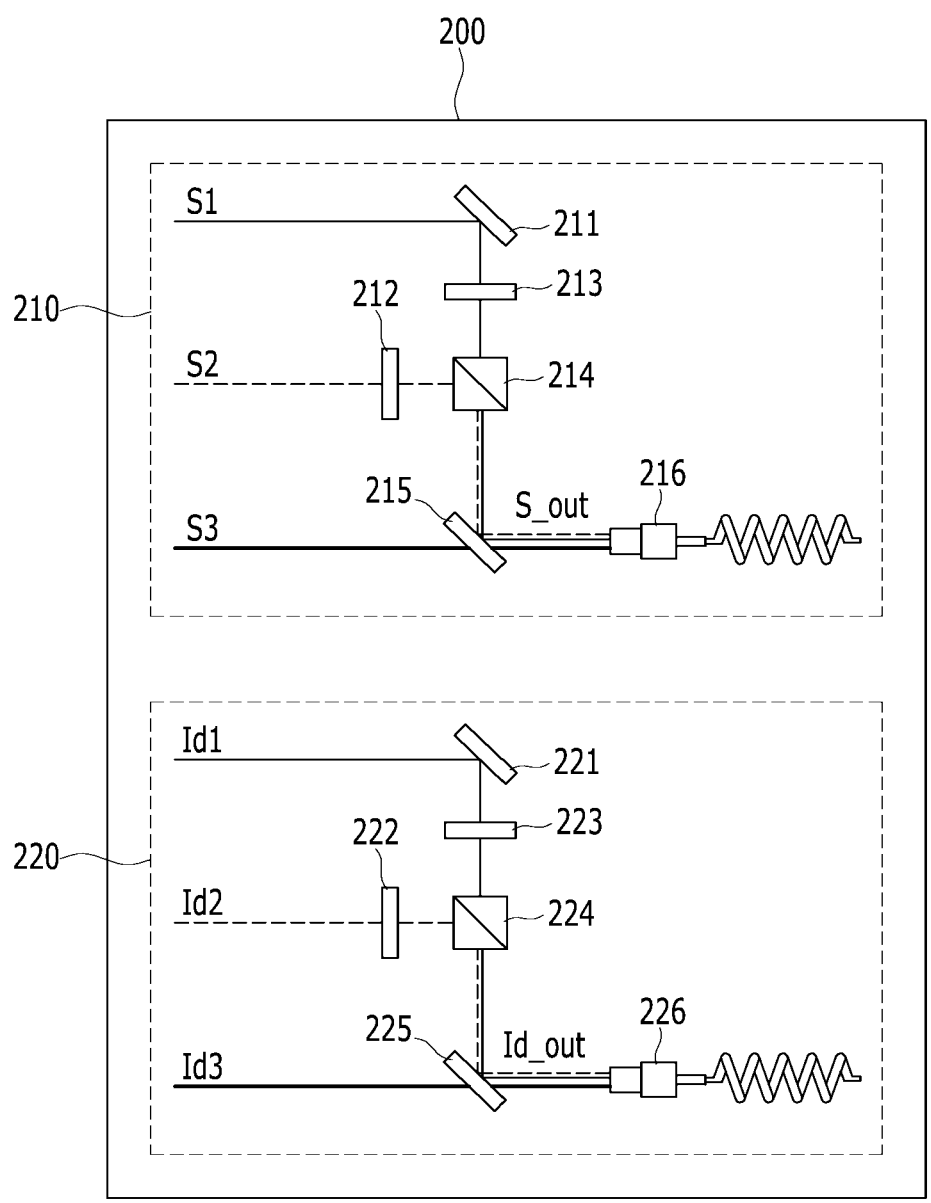
FIG. 3 is a block diagram illustrating an entangled photon pair combiner according to an exemplary embodiment of the present invention.

FIG. 3 is a block diagram illustrating an entangled photon pair combiner according to an exemplary embodiment of the present invention.

Referring to FIG. 3, the entangled photon pair combiner 200 may include a signal combiner 210 and an idler combiner 220.

The signal combiner 210 may be connected to a plurality of optical fibers that transfer the plurality of signals S1, S2, and S3 for each channel in the quantum source generator 100, and the plurality of signals S1, S1 and S3 for each channel may be injected into the signal combiner 210 through the plurality of optical fibers. The signal combiner 210 may be configured to output an enhanced signal S_out by combining the signals S1, S2, and S3 for each channel.

As a component for combining the plurality of signals S1, S2, and S3 for each channel, the signal combiner 210 may include a reflection mirror 211, a plurality of half wave plates 212 and 213, a polarizing beam splitter 214, and a dichroic mirror 215.

The reflection mirror 211 injects the signal S1 of the first channel into one side of the polarizing beam splitter 214. The signal S2 of the second channel may be injected into the other side of the polarizing beam splitter 214, and the polarizing beam splitter 214 may combine the signal S1 of the first channel and the signal S2 of the second channel and output the same. The plurality of half wave plates 212 and 213 may be disposed in optical paths of the signal S1 of the first channel and the signal S2 of the second channel to equalize the intensity of the beam injected into the polarizing beam splitter 214.

The dichroic mirror 215 may reflect combined light of the signal S1 of the first channel and the signal S2 of the second channel combined by the polarizing beam splitter 214 and output, and allow the signal of the third channel S3 to be transmitted therethrough so that the combined light and the signal S3 of the third channel are combined. The enhanced signal S_out obtained by combining the signal S1 of the first channel, the signal S2 of the second channel, and the signal S3 of the third channel may be collected to a multi-mode fiber (MMF) or a single-mode fiber (SMF) through the collimator 216.

The idler coupler 220 is connected to a plurality of optical fibers that transfer the plurality of idlers Id1, Id2, and Id3 for each channel in the quantum source generator 100, and the plurality of idlers Id1, Id1, and Id3 for each channel may be injected into the idler coupler 220 through the plurality of optical fibers. The idler combiner 220 may be configured to output an enhanced idler Id_out by combining the plurality of idlers Id1, Id2, and Id3 for each channel.

As a component for combining the plurality of idlers Id1, Id2, and Id3 for each channel, the idler combiner 220 may be configured to be substantially the same as the signal combiner 210. In other words, the idler coupler 220 may include a reflection mirror 221, a plurality of half wave plates 222 and 223, a polarizing beam splitter 224, and a dichroic mirror 225.

The reflection mirror 221 injects the idler Id1 of the first channel into one side of the polarizing beam splitter 224. The idler Id2 of the second channel may be injected into the other side of the polarizing beam splitter 224, and the polarizing beam splitter 224 may combine the idler Id1 of the first channel and the idler Id2 of the second channel and output the same. The plurality of half wave plates 222 and 223 may be disposed in the optical path of the idler Id1 of the first channel and the idler Id2 of the second channel to equalize the intensity of a beam injected into the polarizing beam splitter 224.

The dichroic mirror 225 may reflect combined light of the idler Id1 of the first channel and the idler Id2 of the second channel which is combined by the polarizing beam splitter 224 and output, and allow the third idler Id3 of the third channel to be transmitted therethrough so that the combined light and the idler (Id3) of the third channel are combined. The enhanced idler Id_out in which the idler Id1 of the first channel, the idler Id2 of the second channel, and the idler Id3 of the third channel are combined may be collected to multi-mode optical fiber (MMF) or single-mode fiber (SMF) through the collimator 226.

Hereinafter, generation of photon pairs by a nonlinear crystal ppKTP having a periodic polling structure will be described with reference to FIGS. 4 to 7.

Figure 4:
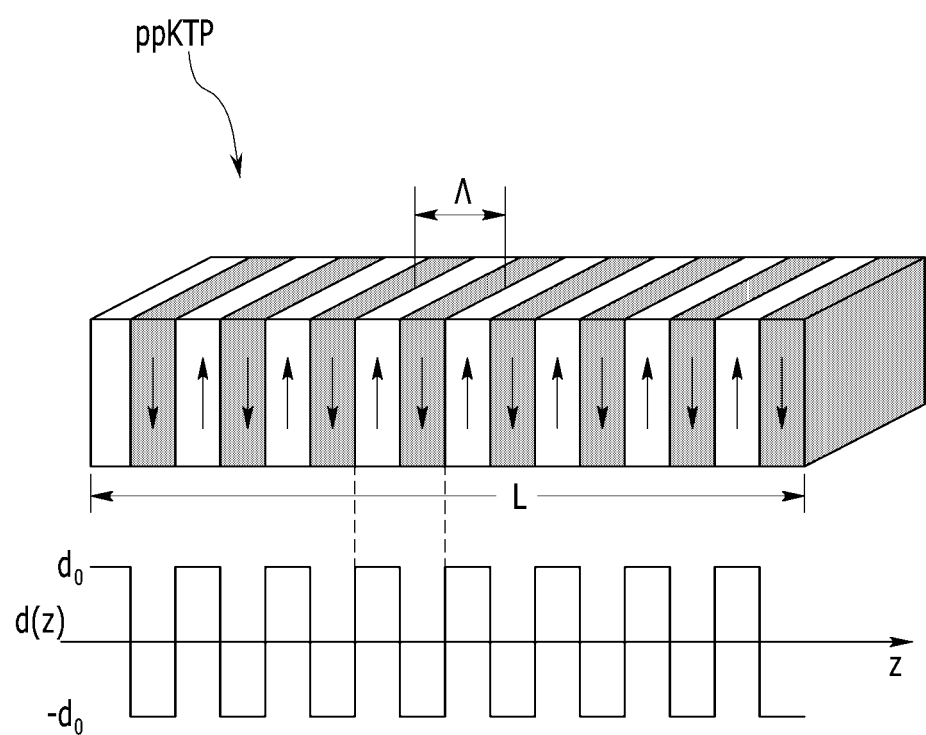
FIG. 4 is an exemplary diagram illustrating a nonlinear crystal having a periodic polling structure according to an exemplary embodiment.
Figure 5:
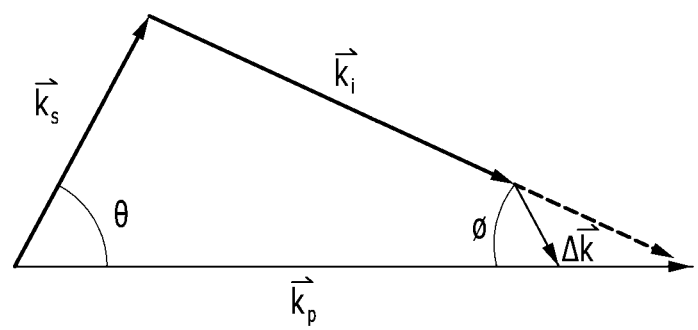
FIG. 5 shows a momentum relationship inside a nonlinear crystal having a periodic poling structure.

FIG. 4 is a diagram illustrating a nonlinear crystal having a periodic polling structure according to an exemplary embodiment. FIG. 5 illustrates a momentum relationship inside a nonlinear crystal having a periodic poling structure.

Referring to FIGS. 4 and 5, an exemplary embodiment of the present invention proposes the high-brightness quantum source 10 based on multi-wavelength combination by forming a type-0 ppKTP crystal having a high second-order nonlinear coefficient in an array form. The ppKTP having a periodic polling structure has a structure in which a sign of a nonlinear coefficient of a crystal is periodically inverted, and an inverse period is referred to as a polling period, and the photon pair is generated toward satisfying a quasi-phase matching condition.

For specific analysis of SPDC, it is necessary to approach through quantum mechanical analysis, which may be expressed by Equation 1. The Hamiltonian for a phase matching condition is represented by an equation of the pump, signals, and idler.

$$\hat{H}_I(t) = \epsilon_0 \int_V \chi^{(2)} \hat{E}_p^{(+)}(\vec{r},t) \hat{E}_s^{(-)}(\vec{r},t) \hat{E}_i^{(-)}(\vec{r},t) d^3 r + H.C. \quad \text{(Equation 1)}$$

Here, $E_p$, $E_s$, $E_i$ represent electric field operators of the pump, signal, and idler, respectively, and HC represent the Hermitian conjugate operator. A mathematical expression of the electric field operator is shown in Equation 2.

$$\hat{E}_p^{(+)}(z,t) = A_p \int_0^\infty \mu_p(\omega_p) \exp[i(k_p r - \omega_p t)] d\omega_p \quad \text{(Equation 2)}$$

$$\hat{E}_s^{(-)}(r,t) = -i \int \varepsilon_s \sqrt{\omega_s} \exp[-i(k_s r - \omega_s t)] d\omega_s$$

$$\hat{E}_i^{(-)}(r,t) = -i \int \varepsilon_i \sqrt{\omega_i} \exp[-i(k_i r - \omega_i t)] d\omega_i$$

Here, $$\mu_p(\omega) = \exp\left[\frac{-(\omega - \bar{\omega}_p)^2}{2(\Delta\omega_p)^2}\right]$$

denotes a frequency envelope (spectral envelope) of the pump, $$\varepsilon_j = \sqrt{\frac{\hbar \bar{\omega}_j}{2\epsilon_0 n V}}$$

denotes a constant value of an electric field.

Therefore, an interaction Hamiltonian may be summarized as in Equation 3.

$$\hat{H}_I(t) = \quad \text{(Equation 3)}$$

$$\epsilon_0 \chi^{(2)} \int_V \int \int \int \varepsilon_s \varepsilon_i \mu_p(\omega_p) A_p e^{-i(w_p - w_s - w_i)t} e^{-i(k_p - k_s - k_i)r} \times$$

$$a_s^\dagger(\omega_s) a_i^\dagger(\omega_i) d\omega_p d\omega_s d\omega_i d^3 r + H.C.$$

A wave function of the photon pair generated from the interaction Hamiltonian obtained above is shown in Equation 4.

$$|\psi\rangle = \left(1 - \frac{i}{\hbar}\int_{-\infty}^{\infty} H_I dt\right)|0\rangle \quad \text{(Equation 4)}$$

$$= |0\rangle \frac{i}{\hbar} N \int dt \int d\omega_s \int d\omega_i \int d\omega_p \int d^3r \mu(\omega_p) \times$$

$$e^{-i(w_p - w_s - w_i)t} e^{-i(k_p - k_s - k_i)z} \hat{a}_s^\dagger(\omega_s) \hat{a}_i^\dagger(\omega_i)|0\rangle$$

$$= |0\rangle - \frac{i}{\hbar}\int\int d\omega_s d\omega_i \mu(\omega_s + \omega_i)\text{sinc}(\Delta kL)\hat{a}_s^\dagger(\omega_s)\hat{a}_i^\dagger(\omega_i)|0\rangle$$

In a sinc function, $\Delta k$ is the degree of phase mismatching and represents a change amount of momentum in a traveling direction (x-axis), and L represents a length of the crystal in the traveling direction. As the degree of phase mismatching increases, the value of the sinc function decreases, and thus, downconversion occurs less. Also, when the conservation of momentum is completely satisfied, the value of the sinc function is maximized as 1.

A momentum relationship inside the nonlinear crystal is as shown in FIG. 5, and the degree of phase mismatching may be expressed as in Equation 5.

$$\Delta k = k_p - k_s \cos\theta - k_i \cos\phi \quad \text{(Equation 5)}$$

Here, as for $\theta$ and $\phi$, in a situation in which the pump beam travels in the x-axis direction of the nonlinear crystal and the signal and idler photon pair travels in an x-y plane, an angle formed by the pump beam and the signal beam is defined as $\theta$ and an angle between the pump beam and the idler beam is defined as $\phi$.

In the case of the nonlinear crystal having a periodic polling period $\Lambda$, such as ppKTP, the nonlinear coefficient $\chi^{(2)}$ treated as a constant in the Hamiltonian appears as a function of distance, an exponential nonlinear coefficient related to momentum has a form of a square wave whose sign is periodically flipped, and thus, it may be expressed as Equation 6 through a Fourier series.

$$\chi^{(2)}(z) \to 4d_{eff}(z) = 4|d_{eff}| \sum_{m=odd} \frac{2}{\pi m} \sin\left(\frac{m\pi}{2}\right) e^{-i(2\pi m/\Lambda)z} \quad \text{(Equation 6)}$$

When the wave function is recalculated in consideration of the periodic nonlinear term, it may be rearranged as in Equation 7.

$$|\psi\rangle = |0\rangle - \frac{i}{\hbar}\int\int d\omega_z d\omega_i \mu(\omega_s + \quad \text{(Equation 7)}$$

$$\omega_i)\sum_m \frac{2}{\pi m}\sin\left(\frac{\pi m}{2}\right)\text{sinc}\left(\frac{\Delta \bar{k}L}{2}\right)\hat{a}_s^\dagger(\omega_s)\hat{a}_i^\dagger(\omega_i)|0\rangle$$

Here, by defining a phase matching condition considering even the polling period as a quasi-phase matching condition, the degree of phase mismatch may be expressed as in Equation 8.

$$\Delta \bar{k} = -k_p(\omega_p) + k_i(\omega_i) + k_s(\omega_s) + \frac{2\pi m}{\Lambda} \quad \text{(Equation 8)}$$

Since the term of interest in the wave function of Equation 7 is a term after SPDC, only the second term may be considered, while ignoring a vacuum term. In addition, as for sums in sigma represented by the Fourier series, only one appropriate m value has a great influence on the result of the formula, and for other values, the sinc function is sufficiently close to 0, so only one m value survives as a result. The degree of phase mismatching in Equation 8 is determined by many factors, such as the type of SPDC, the type of crystal, a size of the polling period, and a wavelength of the pump.

Figure 6:
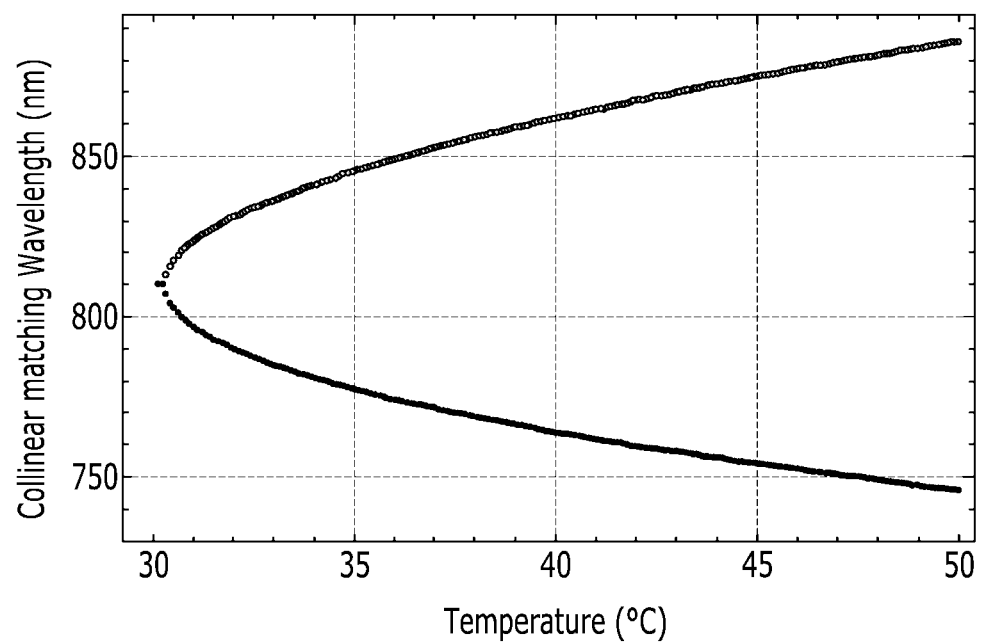
FIG. 6 is a graph illustrating results of simulating an entangled photon pair generation wavelength relation according to the temperature of a Type-0 ppKTP crystal.

FIG. 6 is a graph illustrating simulation results of a relationship between the generation wavelength of an entangled photon pair according to temperature of a type-0 ppKTP crystal.

Referring to FIG. 6, simulation parameters are shown in Table 1.

TABLE 1

| Physical meaning | Symbol | Value | Unit |
|---|---|---|---|
| Length of crystal | L | 30 | mm |
| Polling period | $\Lambda$ | 3.425 | μm |
| Wavelength of pump | $\lambda_p$ | 0.405 | μm |
| Frequency bandwidth of pump | $\Delta\omega_p$ | 10 | THz |
| Included angle between pump and x axis | $\theta_p$ | 0 | rad |
| Primary coefficient of thermal expansion | $\alpha$ | $6.7 \times 10^{-6}$ | $°C.^{-1}$ |
| Secondary coefficient of thermal expansion | $\beta$ | $11 \times 10^{-9}$ | $°C.^{-2}$ |

When a pump beam having a wavelength of 405 nm is injected into type-0 ppKTP, entangled photon pairs that match the temperature conditions of the crystal are generated by SPDC. When simulation is performed under the conditions of Table 1, it can be seen that an entangled photon pair of 810 nm is generated at 30.2° C., and, it can be seen that, as the temperature increases, the wavelengths of the generated signal and idler photon pair become gradually distant.

Figure 7:
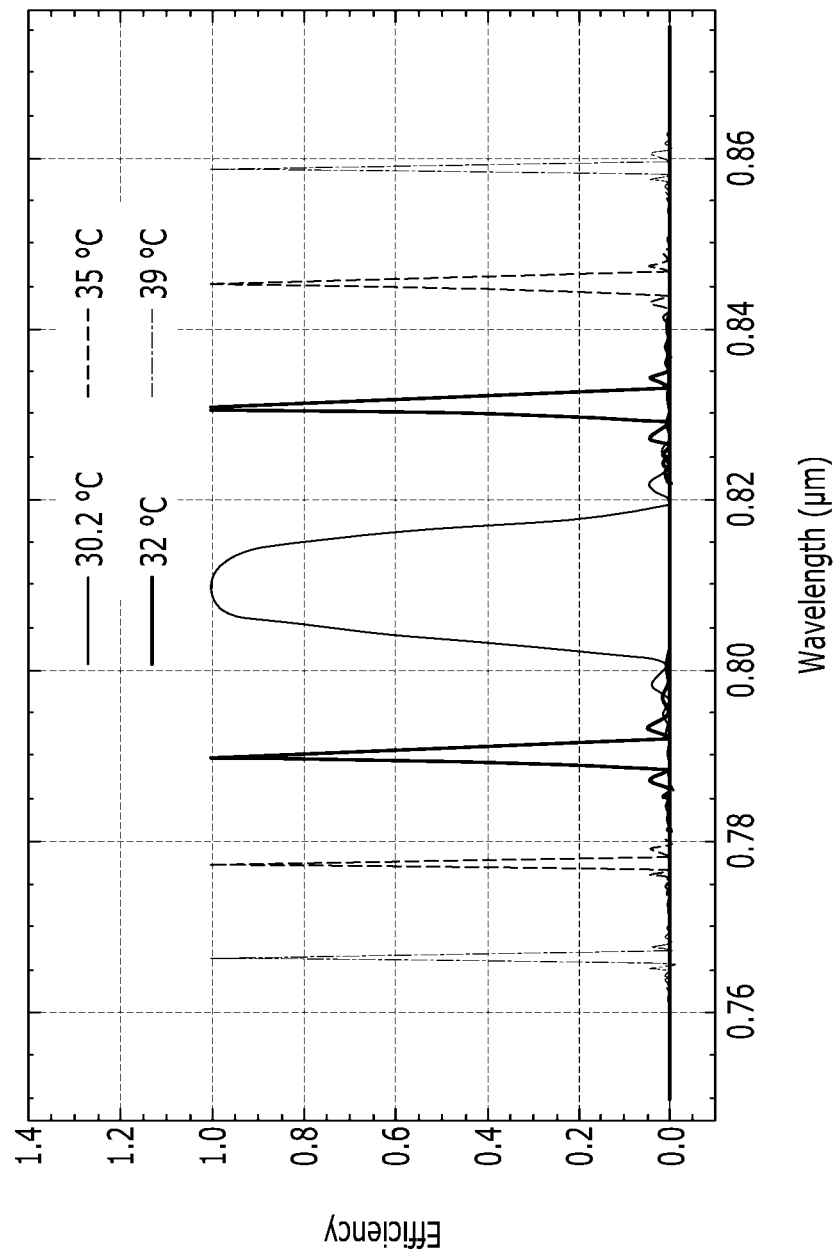
FIG. 7 is a graph illustrating the relationship between photon pair generation wavelength and efficiency according to phase match temperature.

FIG. 7 is a graph illustrating a relationship between a photon pair generation wavelength and efficiency according to a phase matching temperature.

Referring to FIG. 7, the relationship between a photon pair generation wavelength and efficiency according to a phase matching temperature is obtained from the sinc function of the wave function. As described above, it can be seen that wavelengths of photon pairs generated according to different phase matching temperatures are different. Each corresponding line width may be different from the actual simulation, but even considering a case in which a line width is made to be very wide, each wavelength may be separated by significantly changing a temperature or using an optical filter based on the center wavelength of the photons to be generated.

Hereinafter, another exemplary embodiment of the entangled photon pair combiner 200 will be described with reference to FIGS. 8 and 9.

Figure 8:
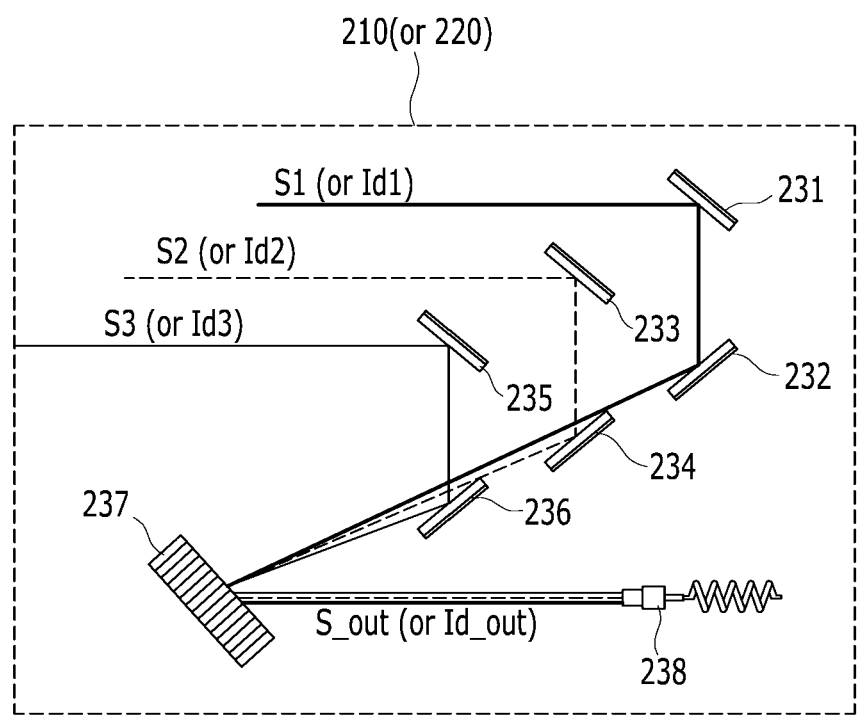
FIG. 8 is a block diagram illustrating an entangled photon pair combiner according to another exemplary embodiment of the present invention.

FIG. 8 is a block diagram illustrating an entangled photon pair combiner according to another exemplary embodiment of the present invention.

Referring to FIG. 8, at least one of a signal combiner 210 and an idler combiner 220 of an entangled photon pair combiner 200 may be configured as follows.

The signal combiner 210 or the idler combiner 220 may include a plurality of reflection mirrors 231, 232, 233, 234, 235, and 236 and a diffraction grating 237. The plurality of reflection mirrors 231, 232, 233, 234, 235, and 236 serve to inject a signal S1 (or an idler Id2) of the first channel, a signal S2 (or an idler Id2) of the second channel, and a signal S3 (or an idler Id3) of the third channel into the diffraction grating 237.

A pair of reflection mirrors 231 and 232 may inject the signal S1 (or the idler Id2) of the first channel into the diffraction grating 237, another pair of reflection mirrors 233 and 234 may inject the signal S2 (or the idler Id2) of the second channel into the diffraction grating 237, and the other pair of reflection mirrors 235 and 236 may inject the signal S3 (or the idler Id3) of the third channel into the diffraction grating 237.

The diffraction grating 237 may combine the signal S1 (or the idler Id2) of the first channel, the signal S2 (or the idler Id2) of the second channel, and the signal S3 (or the idler Id3) of the third channel to generate an enhanced signal S_out (or an enhanced idler Id_out). The enhanced signal S_out (or enhanced idler Id_out) may be collected to a multimode fiber (MMF) or a single mode fiber (SMF) through a fiber coupler 238.

Figure 9:
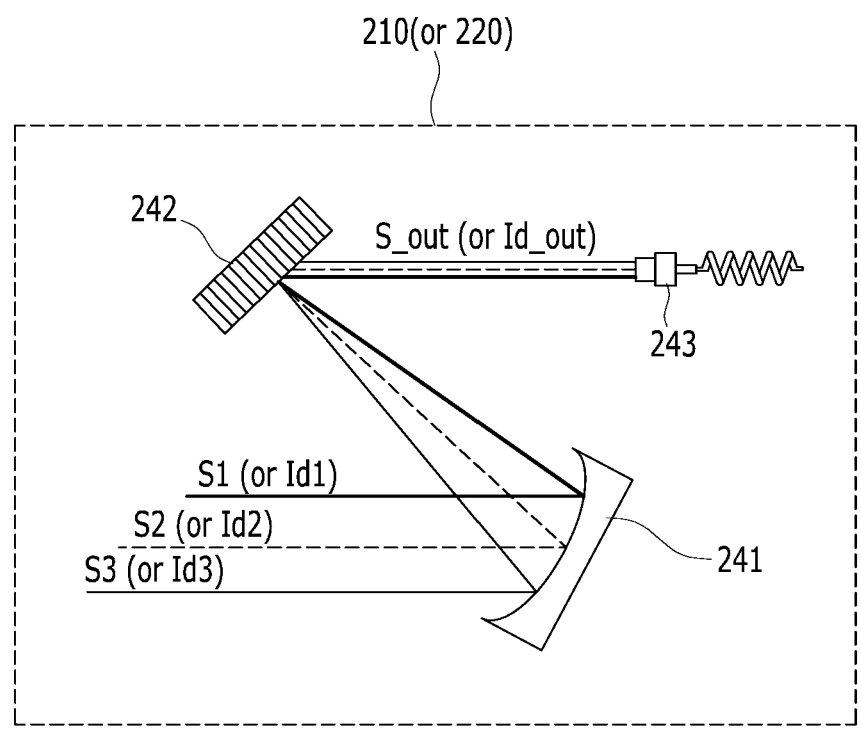
FIG. 9 is a block diagram illustrating an entangled photon pair combiner according to another exemplary embodiment of the present invention.

FIG. 9 is a block diagram illustrating an entangled photon pair combiner according to another exemplary embodiment of the present invention.

Referring to FIG. 9, at least one of the signal combiner 210 and the idler combiner 220 of the entangled photon pair combiner 200 may be configured as follows.

The signal coupler 210 or the idler coupler 220 may include a spherical mirror 241 and a diffraction grating 242.

The spherical mirror 241 may inject the signal S1 (or the idler Id2) of the first channel, the signal S2 (or the idler Id2) of the second channel, and the signal S3 (or the idler Id3) of the third channel into the diffraction grating 242.

The diffraction grating 242 may combine the signal S1 (or the idler Id2) of the first channel, the signal S2 (or the idler Id2) of the second channel, and the signal S3 (or the idler Id3) of the third channel to generate an enhanced signal S_out (or an enhanced idler Id_out). The enhanced signal S_out (or the enhanced idler Id_out) may be collected to a multimode fiber (MMF) or a single mode fiber (SMF) through the fiber coupler 243.

The exemplary embodiments of FIGS. 8 and 9 have the advantage of reducing a size of an optical setup because the signals S1, S2, and S3 or the idlers Id1, Id2, and Id3) of multiple channels may be combined by one diffraction grating 237 or 242. However, since distortion may occur in a spatial mode of a beam after reflection of the diffraction gratings 237 and 242, optical fiber coupling efficiency may decrease. Accordingly, light combination may be configured by selecting the polarizing beam splitters 214 and 224 or the diffraction gratings 237 and 242 according to a configuration of the high-brightness quantum source.

Figure 10:
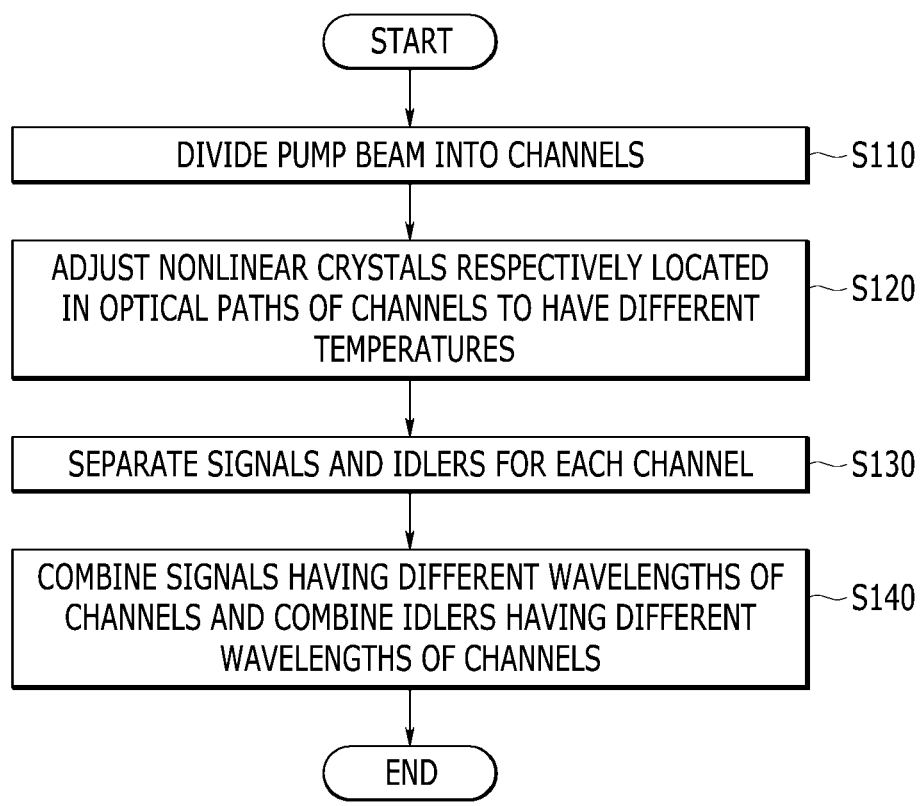
FIG. 10 is a flowchart illustrating a method of generating an entangled photon pair according to an exemplary embodiment of the present invention.

FIG. 10 is a flowchart illustrating a method of generating an entangled photon pair according to an exemplary embodiment of the present invention.

Referring to FIG. 10, the quantum source 10 according to an exemplary embodiment of the present invention may divide a pump beam P into a plurality of channels using a plurality of half wave plates 121, 122, and 123 and a plurality of polarizing beam splitters 124, 125, and 126 (S110). Nonlinear crystals 151, 152, and 153 are located in optical paths of each of the plurality of channels.

The quantum source 10 may adjust the nonlinear crystals 151, 152, and 153 located in each of the plurality of channels to have different temperatures using the temperature controllers 156, 157, and 158 (S120). The nonlinear crystals 151, 152, and 153 of each channel may be type-0 ppKTPs having a periodic polling structure. The three nonlinear crystals 151, 152 and 153 may be arranged side by side in an array. The nonlinear crystals 151, 152, and 153 of each channel may generate a photon pair by causing SPDC when the pump beam P is injected. As the nonlinear crystals 151, 152, and 153 of each channel are adjusted to have different temperatures, photon pairs of each channel may have different wavelengths.

The quantum source 10 removes the pump beam P transmitted through the nonlinear crystals 151, 152, and 153 using the first dichroic mirrors 161, 162, and 163 located in each channel, and the signals S1, S2, and S3 for each channel and the idlers Id1, Id2, and Id3 may be separated using the second dichroic mirrors 164, 165, and 166 (S130). The second dichroic mirrors 164, 165, and 166 of each channel may have different cut-off wavelengths corresponding to photon pairs having different wavelengths for each channel.

The quantum source 10 generates an enhanced signal S_out by combining the signals S1, S2, and S3 having different wavelengths of a plurality of channels and generate an enhanced idler Id_out by combining the idlers Id1, Id2, and Id3 having different wavelengths of a plurality of channels (S140). As illustrated in FIG. 3, the quantum source 10 may combine the signals S1, S2, and S3 having different wavelengths of a plurality of channels by using the polarizing beam splitters 214 and 224 and the dichroic mirrors 215 and 225 and may combine the idlers Id1, Id2, and Id3 having different wavelengths of a plurality of channels by using the polarizing beam splitters 214 and 224 and the dichroic mirrors 215 and 225. Alternatively, as illustrated in FIGS. 8 and 9, the quantum source 10 may combine the signals S1, S2, and S3 having different wavelengths of a plurality of channels or the idlers Id1, Id2, and Id3 having different wavelengths of a plurality of channels by using the diffraction gratings 237 and 242.

The drawings referred to and the detailed descriptions of the present invention are merely illustrative and have been used to describe the present invention but not intended to limit the scope of the present invention described in claims. Thus, a person skilled in the art may easily select therefrom to replace the same. Thus, the scope of the present invention should be determined by claims and the equivalent, rather than by the exemplary embodiment described herein.

What is claimed is:

1. A quantum source comprising:
   a quantum source generator dividing a pump beam into a plurality of channels and generating a plurality of signals and a plurality of idlers using nonlinear crystals respectively located optical paths of the plurality of channels; and
   an entangled photon pair combiner outputting an enhanced signal by combining the plurality of signals and outputting an enhanced idler by combining the plurality of idlers,
   wherein as the respective nonlinear crystals of the plurality of channels are adjusted to different temperatures, the plurality of signals have different wavelengths and the plurality of idlers have different wavelengths.

2. The quantum source of claim 1, wherein:
   the entangled photon pair combiner includes a polarizing beam splitter for combining the plurality of signals or the plurality of idlers.

3. The quantum source of claim 1, wherein:
   the entangled photon pair combiner includes a plurality of reflection mirrors and a diffraction grating for combining the plurality of signals or the plurality of idlers.

4. The quantum source of claim 1, wherein:
   the entangled photon pair combiner includes a spherical mirror and a diffraction grating for combining the plurality of signals or the plurality of idlers.

5. A quantum source comprising:
a first channel unit including a first nonlinear crystal controlled to have a first temperature and generating a signal and an idler of a first channel by injecting a pump beam to the first nonlinear crystal;
a second channel unit including a second nonlinear crystal controlled to have a second temperature and generating a signal and an idler of a second channel by injecting a pump beam to the second nonlinear crystal;
a signal combiner combining the signal of the first channel and the signal of the second channel; and
an idler combiner combining the idler of the first channel and the idler of the second channel.

6. The quantum source of claim 5, wherein:
as the first nonlinear crystal and the second nonlinear crystal are adjusted to have different temperatures, the signal of the first channel and the signal of the second channel have different wavelengths and the idler of the first channel and the idler of the second channel have different wavelengths.

7. The quantum source of claim 5, further comprising:
a third channel unit including a third nonlinear crystal adjusted to have a third temperature and generating a signal and an idler of a third channel by injecting a pump beam to the third nonlinear crystal,
wherein the signal combiner combines the signal of the first channel, the signal of the second channel, and the signal of the third channel, and the idler combiner combines the idler of the first channel, the idler of the second channel, and the idler of the third channel.

8. The quantum source of claim 7, wherein:
the signal combiner includes:
a polarizing beam splitter combining the signal of the first channel and the signal of the second channel; and
a dichroic mirror combining combined light obtained by combining the signal of the first channel to the signal of the second channel, to the signal of the third channel.

9. The quantum source of claim 7, wherein:
the idler combiner includes:
a polarizing beam splitter combining the idler of the first channel and the idler of the second channel; and
a dichroic mirror combining combined light obtained by combining the idler of the first channel to the idler of the second channel, to the idler of the third channel.

10. The quantum source of claim 7, wherein:
the signal combiner includes:
a first diffraction grating; and
a plurality of mirrors for injecting the signal of the first channel, the signal of the second channel, and the signal of the third channel to the first diffraction grating,
wherein the first diffraction grating generates an enhanced signal by combining the signal of the first channel, the signal of the second channel, and the signal of the third channel.

11. The quantum source of claim 7, wherein:
the idler combiner includes:
a second diffraction grating; and
a plurality of mirrors injecting the idler of the first channel, the idler of the second channel, and the idler of the third channel injected into the second diffraction grating,
wherein the second diffraction grating generates an enhanced idler by combining the idler of the first channel, the idler of the second channel, and the idler of the third channel.

12. The quantum source of claim 7, wherein:
the signal combiner includes:
a first diffraction grating; and
a spherical mirror injecting the signal of the first channel, the signal of the second channel, and the signal of the third channel to the first diffraction grating,
wherein the first diffraction grating generates an enhanced signal by combining the signal of the first channel, the signal of the second channel, and the signal of the third channel.

13. The quantum source of claim 7, wherein:
the idler combiner includes:
a second diffraction grating; and
a spherical mirror injecting the idler of the first channel, the idler of the second channel, and the idler of the third channel to the second diffraction grating,
wherein the second diffraction grating generates an enhanced idler by combining the idler of the first channel, the idler of the second channel, and the idler of the third channel.

14. A method of generating entangled photon pairs, the method comprising:
dividing a pump beam into a plurality of channels;
adjusting nonlinear crystals respectively located in optical paths of the plurality of channels to different temperatures;
separating signals and idlers for each of a plurality of channels from photon pairs generated by the nonlinear crystals respectively located in the plurality of channels; and
generating an enhanced signal by combining the signals for each of the plurality of channels, and generating an enhanced idler by combining the idlers for each of the plurality of channels.

15. The method of claim 14, wherein:
the signals for each of the plurality of channels have different wavelengths, and the idlers for each of the plurality of channels have different wavelengths.

* * * * *